United States Patent
Chiang et al.

(10) Patent No.: US 6,451,438 B1
(45) Date of Patent: Sep. 17, 2002

(54) COPOLYMERIZATION OF REACTIVE SILICONE AND URETHANE PRECURSORS FOR USE IN CONDUCTIVE, SOFT URETHANE ROLLERS

(75) Inventors: Albert C. Chiang, Mystic, CT (US); John A. Roderick, Scituate, RI (US)

(73) Assignee: Mearthane Products Corporation, Cranston, RI (US)

( * ) Notice: Subject to any disclaimer, the term of this patent is extended or adjusted under 35 U.S.C. 154(b) by 0 days.

(21) Appl. No.: 09/728,249

(22) Filed: Nov. 30, 2000

(51) Int. Cl.[7] .............................................. B32B 09/64
(52) U.S. Cl. ............ 428/447; 106/287.11; 106/287.12; 361/221; 399/176; 399/279; 399/313; 524/413; 524/435; 528/28; 528/25; 528/38; 492/53
(58) Field of Search ........................ 361/221; 399/176, 399/279, 313; 524/413, 435; 528/52, 28, 38; 106/287.11, 287.12

(56) References Cited

U.S. PATENT DOCUMENTS

| | | |
|---|---|---|
| 3,171,819 A | 3/1965 | Powanda |
| 3,293,728 A | 12/1966 | Hill |
| 3,725,308 A | 4/1973 | Ostolski |
| 3,959,573 A | 5/1976 | Eddy et al. ................. 428/425 |
| 4,130,708 A | 12/1978 | Friedlander et al. .......... 528/28 |
| 4,196,268 A | 4/1980 | Brown et al. |
| 4,231,901 A | 11/1980 | Berbeco |
| 4,257,699 A | 3/1981 | Lentz |
| 4,296,172 A | 10/1981 | Hill ............................ 428/331 |
| 4,350,777 A | 9/1982 | Henrichs et al. ............ 521/110 |
| 4,393,179 A | 7/1983 | Hoppe et al. |
| 4,395,497 A | 7/1983 | Naarman et al. |
| 4,397,974 A | 8/1983 | Goyert et al. |
| 4,568,485 A | 2/1986 | Jonas et al. |
| 4,581,158 A | 4/1986 | Lin |
| 4,617,325 A | 10/1986 | Knobel et al. |
| 4,618,630 A | 10/1986 | Knobel et al. |
| 4,622,361 A | 11/1986 | Gill et al. |
| 4,652,399 A | 3/1987 | Herweh |
| 4,654,279 A | 3/1987 | Bauer et al. |
| 4,655,966 A | 4/1987 | Guillaumon et al. |
| 4,684,538 A | 8/1987 | Klemarczuk ............... 427/54.1 |
| 4,710,015 A | 12/1987 | Takeda et al. |
| 4,728,690 A | 3/1988 | Lammerting et al. ....... 524/714 |
| 4,747,966 A | 5/1988 | Maeno et al. |
| 4,762,899 A | 8/1988 | Shikinami |
| 4,798,851 A | 1/1989 | Werner et al. |
| 4,806,571 A | 2/1989 | Knobel et al. |
| 4,857,623 A | 8/1989 | Emmerling et al. .......... 528/28 |
| 4,886,626 A | 12/1989 | Cope et al. |
| 4,916,199 A | 4/1990 | Bandish et al. .............. 528/28 |
| 4,962,178 A | 10/1990 | Harisiades ................... 528/33 |
| 5,011,739 A | 4/1991 | Nielsen et al. |
| 5,064,574 A | 11/1991 | Oldham et al. |
| 5,077,330 A | 12/1991 | Erhart et al. |
| 5,110,669 A | 5/1992 | Knobel et al. |
| 5,120,812 A | 6/1992 | O'Lenick, Jr. et al. ....... 528/28 |
| 5,156,915 A | 10/1992 | Wilson et al. |
| 5,212,032 A * | 5/1993 | Wilson et al. ............... 430/126 |
| 5,217,838 A | 6/1993 | Wilson et al. |
| 5,221,724 A | 6/1993 | Li et al. ........................ 528/28 |
| 5,238,969 A | 8/1993 | Guarneri et al. |
| 5,247,001 A | 9/1993 | Lacour |
| 5,248,560 A | 9/1993 | Baker et al. |
| 5,250,357 A | 10/1993 | Wilson et al. |
| 5,252,683 A | 10/1993 | Murata et al. ............... 525/458 |

(List continued on next page.)

FOREIGN PATENT DOCUMENTS

| | | |
|---|---|---|
| DE | 28 45 674 | of 1980 |
| EP | 0 122 633 | 10/1984 |
| EP | 0 521 826 | 1/1993 |
| JP | 49-97845 | 9/1974 |
| JP | 49-97846 | 9/1974 |
| JP | 49-97847 | 9/1974 |
| JP | 57-30319 | 2/1982 |
| JP | 60-25159 | 2/1985 |
| JP | 60-189229 | 9/1985 |
| JP | 61-264053 | 11/1986 |
| JP | 62-256990 | 11/1987 |
| JP | 63-48561 | 3/1988 |
| JP | 1-109663 | 4/1989 |
| JP | 2-166158 | 6/1990 |
| JP | 0833433 | 12/1996 |
| JP | 2000186129 | 7/2000 |
| TW | 205038 | 5/1993 |

OTHER PUBLICATIONS

Brunner, "Leitklebstoffe: Die sinnvolle Alternative", Adhaesion, 1987, 31(10), pp. 9–10, 13–13 (Ger.) English Abstract provided.

Chiang, "Synthesis and Electrical Conductivity Measurement of Polyphenylacetylene and Its Derivatives", 1980.

Jasiulek et al., "Stromleitende Klebstoffe–Verlaf der Elektrizitatsleitung", Adhaesion, 1980 24(4), pp. 94–99 (Ger), English abstract provided.

Yoneyama et al., Kogyo Zairyo, 1983, 31(11), pp. 101–106 (Japan) (A review of six references), English abstract provided.

Killis et al., "Ionic Conductivity of Polyether–Polyurethane Networks Containing Alkali Metal Salts. An Analysis of the Concentration Effect", (Abstract) CA100(6):35112y (1984).

*Primary Examiner*—Robert Dawson
*Assistant Examiner*—Marc S Zimmer
(74) *Attorney, Agent, or Firm*—Fish & Richardson P.C.

(57) ABSTRACT

The invention relates to a low tacky, conductive, soft urethane roller for use in a printer. The roller includes a metal salt evenly or homogeneously distributed in a copolymer formed of a diisocyanate, a reactive silicone containing an amine group; and a polyol or a polyamine. The roller can also have a volume resistivity of between about 1E5 ohm-cm and about 5E10 ohm-cm, and includes a metal salt solution in a copolymer formed of a diisocyanate, a reactive silicone containing a hydroxyl group and/or an amine group; and a polyol and/or a polyamine.

54 Claims, No Drawings

U.S. PATENT DOCUMENTS

| | | | |
|---|---|---|---|
| 5,284,600 A | 2/1994 | Hilti et al. | |
| 5,326,845 A | 7/1994 | Linden | 528/28 |
| 5,330,840 A | 7/1994 | Chen et al. | 525/455 |
| 5,348,762 A | 9/1994 | Hofherr et al. | |
| 5,354,641 A | 10/1994 | Lima-Marques | |
| 5,387,627 A | 2/1995 | Hofherr et al. | |
| 5,426,158 A | 6/1995 | Mueller et al. | 528/28 |
| 5,430,533 A | 7/1995 | Dreyfuss et al. | 355/273 |
| 5,432,246 A | 7/1995 | Fenn et al. | 524/199 |
| 5,434,653 A | 7/1995 | Takizawa et al. | 355/259 |
| 5,504,217 A | 4/1996 | Hilti et al. | |
| 5,525,654 A | 6/1996 | Podola et al. | 528/27 |
| 5,554,709 A | 9/1996 | Emmerling et al. | 528/28 |
| 5,574,122 A | 11/1996 | Yeske et al. | 528/59 |
| 5,750,630 A | 5/1998 | Sengupta | 528/59 |
| 5,760,155 A | 6/1998 | Mowrer et al. | 528/28 |
| 5,810,705 A | 9/1998 | Mimura et al. | 492/56 |
| 5,830,541 A | 11/1998 | Carswell et al. | |
| 5,834,116 A | 11/1998 | Sawa et al. | 428/375 |
| 5,874,172 A | 2/1999 | Beach | |
| 5,893,821 A | 4/1999 | Ando et al. | 492/59 |
| 5,933,693 A | 8/1999 | Sakata et al. | 399/286 |
| 5,968,656 A | 10/1999 | Ezenyilimba et al. | 428/423.1 |
| 5,993,366 A | 11/1999 | Kaji et al. | 492/56 |
| 6,042,946 A | 3/2000 | Massie, II et al. | 428/423.1 |
| 6,063,499 A | 5/2000 | Chiang et al. | |
| 6,067,434 A | 5/2000 | Takagi et al. | 399/286 |
| 6,074,756 A | 6/2000 | Vreeland et al. | 428/423.1 |
| 6,087,011 A | 7/2000 | Beach et al. | 428/425.9 |
| 6,117,557 A | 9/2000 | Massie, II et al. | 428/425.9 |
| 6,270,449 B1 * | 8/2001 | Hirayama | 492/54 |

* cited by examiner

US 6,451,438 B1

COPOLYMERIZATION OF REACTIVE SILICONE AND URETHANE PRECURSORS FOR USE IN CONDUCTIVE, SOFT URETHANE ROLLERS

TECHNICAL FIELD

This invention relates to conductive, soft urethane rollers, e.g., developer rollers, charge rollers, or toner transfer rollers, for use in an electrophotographic printer, e.g., a laser printer. The invention also relates to an electrophotographic printer containing such a roller.

BACKGROUND

A laser printer often includes a digital light emitter photoconductor drum, a charge roller, a developer roller, a developer blade, a transfer roller, and a toner storage unit. During printing, the transfer roller supplies toner to the developer roller, and the developer blade forms the toner into a thin, even layer on the surface of the developer roller. The charge roller, which is in contact with the surface of the photoconductive drum, receives a high voltage from a power supply, and charges the photoconductive drum with a positive or negative charge. After the photoconductive drum has been exposed a light emitter, the surface of the photoconductor drum forms an electrostatic latent image. The voltage difference between the developer roll and the photoconductive drum allows the former to transfer toner to the drum surface. Areas of the drum surface that are discharged by the laser attract the toner, whereas areas that are more highly charged repel the toner. The discharged and charged areas thus form toner images. The laser printer may also include a toner-removal wiper that removes excess toner from the surface of the developer roller after the developer roller has contacted the photoconductor drum. The toner on the drum subsequently is transferred to paper, and then fuses to form the print.

Many different designs of laser printers are known. They include Shiraki et al., U.S. Pat. No. 5,768,668; Sato, U.S. Pat. No. 5,752,146; Park, U.S. Pat. No. 5,727,022; Okada et al., U.S. Pat. Nos. 5,669,047 and 5,655,197; Sakaguchi, U.S. Pat. No. 5,602,631; Iguchi et al., U.S. Pat. No. 5,600,417; Ikeda et al., U.S. Pat. No. 5,367,367; Kogo et al., U.S. Pat. Nos. 5,324,885 and 5,214,239; Kinoshita et al., U.S. Pat. Nos. 5,311,264 and 5,287,150; Nishio, U.S. Pat. Nos. 5,241,343, 5,076,201, and 5,062,385; and Goyert et al., U.S. Pat. No. 4,521,582; all of which are incorporated herein by reference.

The charge roller and developer roller are usually cylindrical in shape and typically include a central shaft surrounded by a synthetic rubber or urethane elastomer portion. Many charge rollers for use in electrophotographic printing contain multiple layers of rubber coating or foam coating with carbon black filler inside. Due to the need to coat the surface with multiple layers, low production and high cost result.

Coating a charge roller of high conductivity and soft durometer with one layer of rubber/foam (specifically, urethane) has been a challenging task. Most soft charge rollers having high conductivity (typically, 5E5–5E7) need to contain plasticizer to maintain the right hardness (typically, 25 Shore A–50 Shore A). The use of plasticizer, however, may lead to tackiness on the surface of the roller, which can result in poor print quality.

Having the right hardness is also important for proper functioning of a developer roller. Typically, a developer roller has a durometer ranging from about 50 Shore A to 65 Shore A. For use in a high speed, high resolution printer, rollers are typically required to have lower durometer (e.g., 30–50 Shore A). When the hardness drops to below 50 Shore A, the surface of the roller can become too tacky for the toner powder to be properly transferred from the developer roller to the drum, resulting in poor print quality. On the other hand, a hardness of more than 50 Shore A may lead to partial melting of the toner for high speed, high resolution printers.

SUMMARY OF INVENTION

In general, the invention features a conductive roller (e.g., a developer roller or charge roller) for use in laser printers or other electrophotography printers such as photocopier or thermal printer. The roller includes an inner shaft surrounded by a single layer of conductive solid or foam thermoset copolymer formed of reactive silicone and urethane precursors. A roller containing solid thermoset copolymer means that the thermoset urethane portion contains no void. In contrast, a roller containing foam thermoset copolymer contains void, e.g., a microcellular roller. The rollers generally have a uniform volume resistivity ranging from about 1E5 to about 5E10 ohm-cm; preferably, from about 5E5 to about 5E9 ohm-cm, and a hardness of between about 25 Shore A and about 50 Shore A; preferably, between about 30 Shore A and about 45 Shore A.

The thermoset copolymer exhibits a stable volume resistivity even when the humidity changes from about 10% to about 90% and the temperature changes from about 10° C. to about 40° C. By "stable volume resistivity" is meant that the ratio of volume resistivity at 10° C., 20% relative humidity (LL) to the volume resistivity at 40° C., 90% relative humidity (HH) is less than 50. The thermoset copolymer also exhibits low tackiness under the same conditions (i.e., from LL to HH). The entire copolymer displays uniform conductivity. A roller has low tackiness if it does not adhere to another identical roller during storage, i.e., no pressure is applied to the rollers, and the coefficient of friction is less than 2.0.

In one aspect, the conductive roller contains a metal salt evenly or homogeneously distributed in a copolymer formed of the precursors: (i) a diisocyanate, (ii) a reactive silicone containing an amine group, and (iii) a polyol or a polyamine. The incorporation of silicone into the backbone of the copolymer generally allows the resulting copolymer to have low tackiness property and better resistance to change in humidity and temperature. The roller preferably is substantially free of plasticizer and non-reactive silicone oil. As used herein, a copolymer that is "substantially free" of a material means that the amount of the material is negligible in the composition, i.e., less than about 0.001 wt % of the total weight of the copolymer. By "non-reactive" is meant the silicone oil does not incorporate into the backbone of the copolymer.

In another aspect, the conductive roller has a volume resisitivity of between about 1E5 ohm-cm and about 5E10 ohm-cm and contains a metal salt completely dissolved and evenly or homogeneously distributed in a copolymer formed of the precursors: (i) a diisocyanate, (ii) a reactive silicone containing a hydroxyl group or an amine group, and (iii) a polyol or a polyamine.

The invention also features methods of preparing the roller including the thermoset copolymer, as well as laser printers including the roller.

Other features and advantages will be apparent from the description of the preferred embodiments thereof, and also from the claims.

DETAILED DESCRIPTION

A preferred conductive roller contains a shaft surrounded by a single layer of solid conductive silicone-containing thermoset copolymer. The outer surface of the roller may be uncoated, or may be coated with, e.g., a rubber such as a urethane rubber, nitrile rubber or silicone rubber. The thickness of the coating may be, e.g., between 1.5 and 10 mil. The shaft can be made of steel, aluminum, a conductive plastic, pultrusion conductive rod, or any other material commonly used for the shaft of a conductive roller.

The conductive roller can be used in photographic printing or electrophotographic printing; preferably, the roller is used in electrophotographic printers, e.g., laser printers, thermal printers, and photocopiers.

In one embodiment, the preferred silicone-containing thermoset copolymer is formed of precursors such as a diisocyanate, a polyol or a polyamine, and a reactive silicone containing an amine group. In another embodiment, the preferred silicone-containing thermoset copolymer, which has a volume resistivity of between about 5E5 ohm-cm and about 5E9 ohm-cm, is formed of precursors such as a diisocyanate, a polyol or a polyamine, and a reactive silicone containing a hydroxyl group and/or an amine group.

The silicone-containing thermoset copolymer also includes a solid solution of metal salt evenly or homogeneously distributed therein, and may further include a catalyst, a light stabilizer, or antioxidant. The copolymer is substantially free of a non-reactive silicone oil or a plasticizer that can migrate to the surface of roller after cure.

The preferred isocyanate is a one-shot or prepolymer materials that have an NCO no less than 2, preferably, about 6–32. NCO is defined as the combined % wt of N, C, and O in 100 g of isocyanate. Specific examples of such an isocyanate include methylene diisocyanate (MDI) (e.g., Isonate 2143L, Isonate 180, Isonate 181, Isonate 191, Isonate 226, Isonate 240, and Isonate 125 M, all available from Dow Chemical, Midland, Mich.; Mondur P. F, Mondur M, Mondur XP-744, Mondur CD, and Mondur E-501, all available from Bayer, Pittsburgh, PA.; Lupranate M10, Lupranate M20S, Lupranate M70L, Lupranate M200, Lupranate No. 78 Iso, Lupranate M, Lupranate MS, Lupranate MP-102, Lupranate 103, and Lupranate 218 Iso, all available from BASF, Parsippany, N.J.); hydrogenated methylene diisocyanate (HMDI) (Uniroyal Chemical, Middlebury, CT); toluene diisocyanate (TDI) (Uniroyal Chemical, Middlebury, CT); p-phenylene diisocyanate (PPDI), (Uniroyal Chemical, Middlebury, CT.); hexamethylene diisocyanate (HDI), (Bayer, Pittsburgh, Pa.); and naphthyl diisocyanate (NDI), (Bayer, Pittsburgh, Pa.). The preferred isocyanate also includes prepolymers cured with esters such as adipate or caprolactone or prepolymers cured with polyether such as polypropylene glycol (PPG), polytetramethylene ethylene glycol (PTMEG), or other types of glycol (Du Pont, Wilmington, Del.). The preferred copolymer can include more than one type of isocyanate, e.g., a combination of MDI and PPDI. The preferred weight percent of the isocyanate ranges from 5 wt % to about 85 wt %, and more preferably, from about 10 wt % to about 84 wt %, based on the total weight of the copolymer.

Examples of the preferred polyol or polyamine include butanediol (XB) (available from GAF Chemicals, Wayne N.J.); tremethanol propane (TMP) (available from Hoechst Celanese, Dallas, Tex.); trisopropylamine (TIPA) (available from Dow Chemical, Midland, Mich.); Isonol 93 (available from Upjohn Co., Kalamazo, Mich.); hydroquinone ethyl ether (HQEE) (available from Eastman Chemical Co., Kingsport, Tenn.); hexanediol (available from Aldrich Chemical, Milwaukee, Wis.); Pluracol Polyol 994LV, Pluracol Polyol 816, Pluracol Polyol 945, Pluracol Polyol 1117, Pluracol Polyol 380, Pluracol Polyol HP-6500T, Pluracol Polyol 538, Pluracol Polyol 220, Pluracol Polyol 628, and Pluracol Polyol TPE 4542 (all available from BASF, Parsippany, N.J.); Acclaim Polyol 4220 and Acclaim Polyol 3000 (available from Arco Chemicals, New Square Pa.); and Polamine 3000 and Polamine 4000 (available from Air Products, Allentown, Pa.). The preferred weight percent of polyol or polyamine ranges from 50 wt % to about 85 wt %, and more preferably, from about 55 wt % to about 84 wt %, based on the total weight of the copolymer. The preferred polyol or polyamine has a molecular weight ranging from about 44 to 15,000; preferably, from about 90 to 10,000.

The reactive silicone precursor contains at least one, preferably, two or more, reactive hydrogen atom. A reactive hydrogen atom refers to a hydrogen atom that is displaced in a coupling reaction, for example, a hydrogen atom of a hydroxyl group or an amine group. The hydroxyl group or the amine group can be present at any position of the reactive silicone precursor. The copolymer can be formed of more than one type of reactive silicone precursor, for example, a combination of a reactive silicone precursor having end-capping hydroxyl groups and a reactive silicone precursor having end-capping amino groups.

A urethane linkage (—NH—C(=O)—O—) results when a hydroxyl group of the reactive silicone precursor reacts with the diisocyanate; whereas a urea linkage (—NH—C(=O)—NH—) results when an amine group of the reactive silicone precursor reacts with the diisocyanate. In general, copolymers containing polyurea displays higher rigidity than those containing polyurethane. The rigidity of the copolymer can be adjusted by the ratio of the number of hydroxyl groups to the number of amino groups present in the silicone precursor. Moreover, as mentioned above, the preferred silicone-containing copolymers have better resistance towards changes in humidity.

Preferably, the reactive hydrogen atom forms part of an end-capping group of the precursor. An end-capping group, e.g., a hydroxyl or an amine group, is a group attaching to the silicon atom at the ends of the precursor. The preferred reactive silicone precursor can contain an end-capping amino group, an end-capping hydroxyl group, or a mixture of both, thus resulting in a linear copolymer when polymerizes with the diisocyanate. See the general formula below:

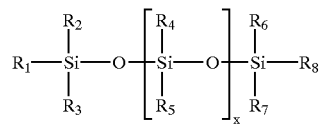

Each of $R_1$, $R_5$, and $R_8$, independently, is hydrogen, alkyl, aryl, aralkyl, alkoxy, aryloxy, aralkoxy, hydroxyalkyl, aminoalkyl, hydroxyalkoxy, aminoalkoxy, hydroxyl, or amino. Preferably, each of $R_1$, $R_5$, and $R_8$, independently, is hydrogen, methyl, ethyl, amino-substituted phenyl, hydroxyl-substituted phenyl, methoxy, ethoxy, hydroxyl, or amino. Each of $R_2$, $R_3$, $R_4$, $R_6$, and $R_7$, independently, is hydrogen, alkyl, aryl, aralkyl, alkoxy, aryloxy, or aralkoxy. Preferably, each of $R_2$, $R_3$, $R_4$, $R_6$, and $R_7$, independently, is hydrogen, methyl, ethyl, phenyl, naphthyl, or alkylphenyl. x is 10–2,000, preferably, 20–500. At least one of $R_1$, $R_5$, and $R_8$ has to contain a hydroxyl group or an amino group. Note that $R_1$, $R_2$, $R_3$, $R_6$, $R_7$, and $R_8$ are end-capping groups of the above-depicted reactive silicone precursor.

Alkyl, as used herein, is a straight or branched hydrocarbon chain containing 1 to 8 carbon atoms. Examples of alkyl include, but are not limited to, methyl, ethyl, propyl, isopropyl, butyl, isobutyl, sec-butyl, tert-butyl, n-pentyl, and 2-methylhexyl. As used herein, aryl is an aromatic group containing 6–12 ring atoms and can contain fused rings, which may be saturated, unsaturated, or aromatic. Examples of an aryl group include phenyl, naphthyl, biphenyl, phenanthryl, and anthracyl.

Examples of the preferred reactive silicone precursor include GP-145, GP-6, and GP7100 (available from Genesee Polymer Corp., Mich.). The preferred weight percent of reactive silicone precursor ranges from 0.5 wt % to about 20 wt %, and more preferably, from about 2 wt % to about 10 wt %, based on the total weight of the copolymer. The preferred reactive silicone precursor has a molecular weight ranging from about 500 to 30,000; preferably, from about 1,000 to 15,000.

The metal salt provides the silicone-containing thermoset copolymer with the appropriate conductivity, for example, a volume resistivity ranges from about 1E5 to about 5E100 ohm-cm, preferably, from about 1E6 to about 5E8 ohm-cm. The metal salt is fully dissolved and evenly or homogeneously complexed with the thermoset copolymer, resulting in a uniform, three-dimensional charge distribution. Examples of metal salts that can be used include transition metal halide salts such as iron chloride, copper chloride, iron bromide, iron iodide, copper iodide, and copper bromide; and lithium salts such as lithium chloride, lithium bromide, and lithium perchlorate. All of these are available from Aldrich Chemical, Milwaukee, Wis. The thermoset copolymer typically includes between about 0.001% and about 5%, preferably, between about 0.002% and 2%, of the metal salt by weight.

In one embodiment, the preferred copolymer, which is formed of a reactive silicone precursor having an amino group, contains one or more of a transition metal salt (e.g., iron chloride or copper chloride). This copolymer can be used in forming a roller in a xerographic printer. In another embodiment, the preferred copolymer, which is formed of a reactive silicone precursor having a hydroxyl group, contains one or more of a lithium salt (e.g., lithium perchlorate). This copolymer can be used in forming a roller in a laser printer.

Examples of catalysts that can be used in forming the copolymer include Fomrez UL-32 and Fomrez 29 (available from Witco, Taft, La.); and Dabco T-12, Dabco T-9, and Dabco 331v (available from Air Products, Allentown, Pa.). The copolymers may include, for example, between about 0.005% and about 1% of the catalyst by weight.

Examples of UV light stabilizers that can be used include Tinuvin P, Tinuvin C 353 FF, Tinuvin 111 FB, Tinuvin 111 FDL, Tinuvin 123, Tinuvin 144, Tinuvin 213, Tinuvin 234, Tinuvin 326, Tinuvin 327, Tinuvin 328, Tinuvin 622LD, Tinuvin 765, Tinuvin 770 DF, Tinuvin 783FB, Tinuvin 783FD, Tinuvin 783FDL, Uvitex OB, Chimassorb 81, Chimassorb 119FL, and Chimassorb 944 LD/FL (all available from Ciba, Tarrytown, N.Y.). Typically, the thermoset copolymer includes between about 0.1% and about 5%; preferably, between about 1% and about 3%, of the stabilizer by weight.

Examples of antioxidants include Irganox 245, Irganox 1010, Irganox 1076, Irganox 1098, Irganox 1135, Irganox 5057, and Naugard (2,6-di-tert-butyl-p-cresol, BHT) (all available from Ciba, Torryton, N.Y.). The thermoset copolymer generally includes between about 0.1% and about 5%; preferably, about 0.1% and about 3%, of the antioxidant by weight.

Both the UV light stabilizer and the antioxidant inhibit the addition reaction and oxidation reaction of the roller surface.

The roller can be prepared by combining the appropriate urethane precursors and other ingredients in a tube or shaft mold that includes a pre-baked shaft with an adhesive coating. The shaft can be, for example, in a rod-shaped or a circular tube, while the mold can be in U-shaped, rectangular, square, or circular. The molding procedure can be, for example, vertical or horizontal casting, spin casting, a centrifugal method, or an extrusion or protrusion process. The mixture is cured for 15–30 minutes at 160–180° F., and the resulting roller is demolded and post-cured for 12–16 hours at 180° F. in the oven. The desired top coating (if any) is applied to the roller by an extrusion or spray-coating process, and then may undergo finish grinding to provide a final roller with specified dimensioning, resistivity, and surface roughness for use in a laser printer.

In a preferred procedure, the metal salt is at least partially dissolved in polyol/polyamine before being combined with the additional polyol/polyamine, reactive silicone precursor, and isocyanate to form a solution in which the salt is completely dissolved. This typically is accomplished, for example, by heating a mixture including the salt and polyol/polyamine at an elevated temperature (e.g., 80° F.–130° F.) for one or two hours under vacuum. For purposes of this application, the resultant solution will be referred to as the "conductive curative." The conductive curative also may include, for example, the UV light stabilizer and/or antioxidant and/or coloration.

Conductivity measurement is obtained using the method ASTM D257-78 (Keithley 487 picoammeter/voltage source). Hardness measurement is determined by using Shore instrument.

EXAMPLE 1

An example of a charge roller including a thermoset urethane portion was made according to the following procedure, using a Max machine, an automated metering machine.

The Max machine was set up to meter three streams of materials including isocyanate, a mixture of reactive silicone precursor and polyol, and conductive curative (which includes polyol, metal salt, and other ingredients such as antioxidant, UV stabilizer, or coloration) into a steel mold with eight cavities, according to the following process parameters (total flow rate 650 g/min):

| Stream | Temperature | Material | Flow rate (g/min) |
| --- | --- | --- | --- |
| B1 | 90° F. | Isocyanate 2143L (I-2143) | 73.3 |
| B2 | 150° F. | Reactive silicone precursor (GP145)/ polyol (HP-6500T) | 348.2 |
| A | 90° F. | Conductive curative | 228.6 |

The B1 stream was continuously feeding from a 55-gallon drum under high vacuum. The NCO of the isocyanate was 28.91.

To obtain the B2 stream, 9 kg of HP-6500T was placed in a 5-gallon container and heated to 150° F. This was followed by slowly adding 1 kg of GP-145 to the 5-gallon container under mechanical stirring.

The following ingredients were mixed to form stream A:

| Composition | Amount (parts) | Amount (kg) |
|---|---|---|
| Pluracol polyol (HP-6500T) | 325.87 | 68.04 |
| Poly BD (20LM) | 24.00 | 5.01 |
| TIPA | 1.50 | 0.31 |
| XB | 11.50 | 2.4 |
| Anhydrous lithium perchlorate | 8.50 | 1.8 |
| UV light stabilizer (T-328) | 12.00 | 2.5 |
| Antioxidant (BHT) | 3.50 | 0.73 |
| Catalyst (UL-29) | 0.15 | 0.03 |
| Black coloration | 1.20 | 0.25 |

The ingredients listed above were mixed in a 55-gallon container at 120° F. for two hours under vacuum. The mixture was then cooled to about 90° F. with stirring before it was charged (as stream A) into the Max machine.

To prepare the shaft (which has an OD of 10 mm and a length of 27.5 mm), it was first coated with a conductive adhesive (e.g., MPC Conadh 1000, available from Mearthane Products of Cranston, R.I.) using a brush while the shaft was rotating. The conductive adhesive-coated shaft was dried under venting oven for at least three hours, which was then prebaked at 220° F. for at least two hours. The shaft was then assembled in a cavity having an OD of 21.8 mm and a length of 241 mm.

The materials of streams A, B1, and B2 (prepared according to the protocol set forth above) were then poured from the Max machine then poured into a mold of eight cavities. The mold was maintained at 160° F. on rotatory round table equipped with heating hood for about 10–15 minutes (while the materials of streams A, B1, and B2 are being cured). The cured copolymer was then taken out of the cavity and postcured at 180° F. for 8–16 hours.

A cube for hardness testing was also prepared by pouring the materials (streams A, B1, and B2) into a separate cube mold, 1.2"×1.3"×0.5", which stays next to the mold at the same temperature (i.e., the mold temperature) during molding and postcuring.

After rough grinding and finish grinding, the properties of the thermoset copolymer portion of the roller were tested. The thermoset copolymer had a hardness (on cube) of 42 Shore A and a hardness (on roller) of 50–53 Shore A. Volume resistivity of the cube and the roller were also measured. The cube and the roller were placed in a humidity chamber at 72° F., 50% relative humidity before measurements. Both displayed a volume resistivity of about 2E6 after two weeks in the chamber.

The roller was finish grinded to a size of 18.7 mm OD and 230 mm length (for the urethane portion). The final roller had a surface roughness of less than 0.6 μm, preferably about 0.4 μm.

EXAMPLE 2–8

Charge rollers described in the following examples were prepared using the same general procedure used in Example 1. The following tables provide the amount (in parts) of each ingredient in the thermoset copolymer:

| Stream | Ex. 2 | Ex. 3 | Ex. 4 | Ex. 5 | Ex. 6 | Ex. 7 | Ex. 8 |
|---|---|---|---|---|---|---|---|
| B1 (I-2143L) | 100.0 | 100.0 | 100.0 | 100.0 | 100.0 | 100.0 | 100.0 |

| Stream | Ex. 2 | Ex. 3 | Ex. 4 | Ex. 5 | Ex. 6 | Ex. 7 | Ex. 8 |
|---|---|---|---|---|---|---|---|
| A | 437.3 | 396.7 | 548.6 | 419.2 | 480.5 | 477.1 | 475.3 |
| Conductive curative B2 (GP-145/HP-6500T) | 400.0 | — | — | 503.5 | 312.0 | 312.0 | 312.0 |
| B2 (GP-145/P-380) | — | 334.3 | 322.4 | — | — | — | — |

Listed below is the composition of conductive curative (stream A) in each of Examples 2–8:

| Composition | Ex. 2 | Ex. 3 | Ex. 4 | Ex. 5 | Ex. 6 | Ex. 7 | Ex. 8 |
|---|---|---|---|---|---|---|---|
| HP-6500T | 325.9 | — | — | 350.0 | 325.9 | 325.9 | 325.9 |
| P-380 | — | 250.0 | 450.0 | — | — | — | — |
| Poly BD (20LM) | 24.0 | 24.0 | 24.0 | 24.0 | 24.0 | 24.0 | 24.0 |
| TIPA | 1.5 | 1.5 | 1.5 | 1.5 | 1.5 | 1.5 | 1.5 |
| XB | 11.5 | 11.5 | 11.5 | 11.5 | 11.5 | 11.5 | 11.5 |
| Lithium perchlorate (anhy.) | 1.0 | 5.4 | 7.4 | 8.5 | 10.0 | 13.0 | 14.0 |
| Iron (III) chloride | — | — | — | — | — | — | 9 |
| T-328 | 12.0 | 12.0 | 12.0 | 12.0 | 12.0 | 12.0 | 12.0 |
| BHT | 3.5 | 3.5 | 3.5 | 3.5 | 3.5 | 3.5 | 3.5 |
| Carbon black | — | — | — | — | 4.0 | 4.0 | 4.0 |
| UL-29 | 0.15 | 0.03 | 0.04 | 0.15 | 0.15 | 0.15 | 0.15 |
| Black coloration | 1.2 | 1.2 | 1.2 | 1.2 | 1.2 | 1.2 | 1.2 |

Listed below is the composition of reactive silicone/polyol (stream B2) in each of Examples 2–8:

| Composition | Ex. 2 | Ex. 3 | Ex. 4 | Ex. 5 | Ex. 6 | Ex. 7 | Ex. 8 |
|---|---|---|---|---|---|---|---|
| GP-145 | 10.0 | 20.0 | 20.0 | 10.0 | 10.0 | 10.0 | 10.0 |
| HP-6500T | 90.0 | — | — | 90.0 | 90.0 | 90.0 | 90.0 |
| P-380 | — | 80.0 | 80.0 | — | — | — | — |

Physical properties of the roller prepared in each of Examples 2–8 are provided below:

| Properties | Ex. 2 | Ex. 3 | Ex. 4 | Ex. 5 | Ex. 6 | Ex. 7 | Ex. 8 |
|---|---|---|---|---|---|---|---|
| Hardness | 36 A | 35 A | 32 A | 34 A | 41 A | 40 A | 40 A |
| Vol. Resistivity (ohm-cm) | 1.8E7 | 2.2E7 | 1.3E7 | 1.2E7 | 1.0E7 | 1.5E7 | 1.6E7 |

EXAMPLES 9–14

Developer rollers described in the following examples were prepared using the same general procedure used in Example 1. The following tables provide the amount (in parts) of each ingredient in the thermoset copolymer:

| Stream | Temp. | Ex. 9 | Ex. 10 | Ex. 11 | Ex. 12 | Ex. 13 | Ex. 14 |
|---|---|---|---|---|---|---|---|
| B1 (V-6020; NCO = 6.85) | 180° F. | 100.0 | 100.0 | 100.0 | 100.0 | 100.0 | 100.0 |
| A Conductive curative | 150° F. | 24.7 | 21.7 | 21.8 | 21.8 | 21.8 | 21.8 |
| B2 (GF-145/HP-6500T) | 90° F. | 165.6 | 172.2 | 173.0 | 173.0 | 173.0 | 173.0 |

Listed below is the composition of conductive curative (stream A) in each of Examples 9–14:

| Composition | Ex. 9 | Ex. 10 | Ex. 11 | Ex. 12 | Ex. 13 | Ex. 14 |
|---|---|---|---|---|---|---|
| HP-6500T | 250.0 | 200.0 | 200.0 | 200.0 | 200.0 | 200.0 |
| T-1000 | 20.0 | 20.0 | 20.0 | 20.0 | 20.0 | 20.0 |
| TIPA | 20.0 | 20.0 | 20.0 | 20.0 | 20.0 | 20.0 |
| I-93 | 80.0 | 80.0 | 80.0 | 80.0 | 80.0 | 80.0 |
| Iron (III) chloride | 0.56 | 0.08 | 0.14 | 0.20 | — | — |
| Copper (II) chloride | 0.07 | 0.01 | 0.02 | — | 0.25 | — |
| Lithium perchlorate (anhy.) | 0.07 | 0.01 | 0.02 | — | — | 0.22 |
| T-328 | 6.0 | 6.0 | 6.0 | 6.0 | 6.0 | 6.0 |
| BHT | 3.0 | 3.0 | 3.0 | 3.0 | 3.0 | 3.0 |
| T-12 | 0.19 | 0.19 | 0.19 | 0.19 | 0.19 | 0.19 |
| Black coloration | 1.2 | 1.2 | 1.2 | 1.2 | 1.2 | 1.2 |

Listed below is the composition of reactive silicone/polyol (stream B2) in each of Examples 9–14:

| Composition | Ex. 9 | Ex. 10 | Ex. 11 | Ex. 12 | Ex. 13 | Ex. 14 |
|---|---|---|---|---|---|---|
| GP-145 | 5.0 | 10.0 | 10.0 | 10.0 | 10.0 | 10.0 |
| HP-6500T | 95.0 | 90.0 | 90.0 | 90.0 | 90.0 | 90.0 |

Properties of the roller prepared in each of Examples 9–14 are provided below:

| Properties | Ex. 9 | Ex. 10 | Ex. 11 | Ex. 12 | Ex. 13 | Ex. 14 |
|---|---|---|---|---|---|---|
| Hardness | 40 A | 43 A | 43 A | 43 A | 43 A | 43 A |
| Vol. Resistivity (ohm-cm) | 1.4E8 | 2.0E9 | 1.0E9 | 1.1E9 | 1.3E9 | 1.0E9 |

Other embodiments are within the claims.

What is claimed is:

1. A conductive roller for use in a printer, the roller comprising a metal salt evenly distributed in a copolymer formed of the following precursors:
   (i) a diisocyanate;
   (ii) a reactive silicone containing an amine group; and
   (iii) a polyol or a polyamine.

2. The conductive roller of claim 1, wherein the roller is suitable for use in a laser printer.

3. The conductive roller of claim 1, wherein the roller includes a solid solution of metal salt evenly distributed in the copolymer.

4. The conductive roller of claim 1, the roller being substantially free of plasticizer and free of non-reactive silicone oil.

5. The conductive roller of claim 1, wherein the copolymer includes between about 0.001% and about 5% of the metal salt by weight.

6. The conductive roller of claim 1, wherein the metal salt is a transition metal salt or a lithium salt.

7. The conductive roller of claim 1, wherein the metal salt is selected from the group consisting of iron chloride, copper chloride, lithium perchlorate, lithium chloride, lithium bromide, lithium iodide, iron bromide, iron iodide, copper bromide, and copper iodide.

8. The conductive roller of claim 1, wherein the amount of reactive silicone is about 0.5 wt % to about 20 wt % based on the total weight of the copolymer.

9. The conductive roller of claim 1, wherein the molecular weight of the reactive silicone ranges from about 500 to about 30,000.

10. The conductive roller of claim 1, wherein the molecular weight of the reactive silicone ranges from about 1,000 to about 15,000.

11. The conductive roller of claim 1, wherein the reactive silicone further contains a hydroxyl group.

12. The conductive roller of claim 11, wherein the reactive silicone contains an end-capping amino group or an end-capping hydroxyl group.

13. The conductive roller of claim 12, wherein the amount of diisocyanate is about 10 wt % to about 5 0 wt %; the amount of reactive silicone is about 1 wt % to about 20 wt %; and the amount of polyol/polyamine is about 50 wt % to about 85 wt %.

14. The conductive roller of claim 12, the roller having a volume resistivity of between about 1E5 ohm-cm and about 5E10 ohm-cm.

15. The conductive roller of claim 1, wherein the reactive silicone has the following formula:

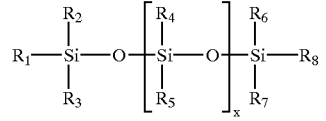

wherein each of $R_1$, $R_5$, and $R_8$, independently, is hydrogen, alkyl, aryl, aralkyl, alkoxy, aryloxy, aralkoxy, hydroxyalkyl, aminoalkyl, hydroxyalkoxy, aminoalkoxy, hydroxyl, or amino; each of $R_2$, $R_3$, $R_4$, $R_6$, and $R_7$, independently, is hydrogen, alkyl, aryl, aralkyl, alkoxy, aryloxy, or aralkoxy; and x is 10–2,000; provided that at least one of $R_1$, $R_5$, and $R_8$ contains a hydroxyl group or an amino group.

16. The conductive roller of claim 15, wherein each of $R_1$, $R_5$, and $R_8$, independently, is hydrogen, methyl, ethyl, amino-substituted phenyl, hydroxyl-substituted phenyl, methoxy, ethoxy, hydroxyl, or amino; each of $R_2$, $R_3$, $R_4$, $R_6$, and $R_7$, independently, is hydrogen, methyl, ethyl, phenyl, naphthyl or alkylphenyl; and x is 20–500.

17. The conductive roller of claim 1, wherein the amount of polyol and/or polyamine is about 50 wt % to about 85 wt % based on the total weight of the copolymer.

18. The conductive roller of claim 1, wherein the polyol and/or polyamine has a molecular weight ranges from about 44 to about 15,000.

19. The conductive roller of claim 1, the roller having a hardness of between 25 shore A and 50 shore A.

20. The conductive roller of claim 1, wherein the copolymer exhibits a stable volume resistivity even when the humidity changes from about 10% to about 90% and the temperature changes from about 10° C. to about 40° C.

21. The conductive roller of claim 1, wherein the copolymer exhibits low tackiness even when the humidity changes from about 10% to about 90% and the temperature changes from about 10° C. to about 40° C.

22. A conductive roller for use in a printer, the roller having a volume resistivity of between about 1E5 ohm-cm and about 5E10 ohm-cm and comprising a metal salt evenly distributed in a copolymer formed of the following precursors:
   (i) a diisocyanate;
   (ii) a reactive silicone containing a hydroxyl group or an amine group; and
   (iii) a polyol or a polyamine;
      wherein the metal salt is selected from the group consisting of transition metal salts and lithium salts.

23. The conductive roller of claim 22, the roller having a volume resistivity of between about 5E5 ohm-cm and about 5E8 ohm-cm.

24. The conductive roller of claim 22, wherein the roller is suitable for use in a laser printer.

25. The conductive roller of claim 22, wherein the roller includes a solid solution of metal salt evenly distributed in the copolymer.

26. The conductive roller of claim 22, the roller being substantially free of plasticizer and free of non-reactive silicone oil.

27. The conductive roller of claim 22, wherein the copolymer includes between about 0.001% and about 5% of the metal salt by weight.

28. The conductive roller of claim 22, wherein the metal salt is selected from the group consisting of iron chloride, copper chloride, lithium perchlorate, lithium chloride, lithium bromide, lithium iodide, iron bromide, iron iodide, copper bromide, and copper iodide.

29. The conductive roller of claim 22, wherein the amount of reactive silicone is about 1 wt % to about 20 wt % based on the total weight of the copolymer.

30. The conductive roller of claim 22, wherein the molecular weight of the reactive silicone ranges from about 500 to about 30,000.

31. The conductive roller of claim 22, wherein the molecular weight of the reactive silicone ranges from about 1,000 to about 15,000.

32. The conductive roller of claim 22, wherein the reactive silicone contains an end-capping amino group or an end-capping hydroxyl group.

33. The conductive roller of claim 32, wherein the amount of diisocyanate is about 10 wt % to about 50 wt %; the amount of reactive silicone is about 1 wt % to about 20 wt %; and the amount of polyol/polyamine is about 50 wt % to about 85 wt %.

34. The conductive roller of claim 22, wherein the reactive silicone has the following formula:

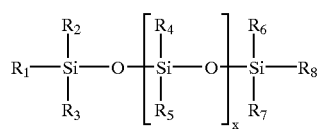

wherein each of $R_1$, $R_5$, and $R_8$, independently, is hydrogen, alkyl, aryl, aralkyl, alkoxy, aryloxy, aralkoxy, hydroxyalkyl, aminoalkyl, hydroxyalkoxy, aminoalkoxy, hydroxyl, or amino; each of $R_2$, $R_3$, $R_4$, $R_6$, and $R_7$, independently, is hydrogen, alkyl, aryl, aralkyl, alkoxy, aryloxy, or aralkoxy; and x is 10–2,000; provided that at least one of $R_1$, $R_5$, and $R_8$ contains a hydroxyl group or an amino group.

35. The conductive roller of claim 34, wherein each of $R_1$, $R_5$, and $R_8$, independently, is hydrogen, methyl, ethyl, amino-substituted phenyl, hydroxyl-substituted phenyl, methoxy, ethoxy, hydroxyl, or amino; each of $R_2$, $R_3$, $R_4$, $R_6$, and $R_7$, independently, is hydrogen, methyl, ethyl, phenyl, naphthyl or alkylphenyl; and x is 20–500.

36. The conductive roller of claim 22, wherein the amount of polyol and/or polyamine is about 50 wt % to about 85 wt % based on the total weight of the copolymer.

37. The conductive roller of claim 22, wherein the polyol and/or polyamine has a molecular weight ranges from about 44 to about 15,000.

38. The conductive roller of claim 22, the roller having a hardness of between 25 shore A and 50 shore A.

39. The conductive roller of claim 22, wherein the copolymer exhibits a stable volume resistivity even when the humidity changes from about 10% to about 90% and the temperature changes from about 10° C. to about 40° C.

40. The conductive roller of claim 22, wherein the copolymer exhibits low tackiness even when the humidity changes from about 10% to about 90% and the temperature changes from about 10° C. to about 40° C.

41. The laser printer of claim 40, wherein the copolymer exhibits a stable volume resistivity and low tackiness even when the humidity changes from about 10% to about 90% and the temperature changes from about 10° C. to about 40° C.

42. A laser printer comprising a conductive roller, the roller having metal salt evenly distributed in a copolymer formed of the following precursors:
   (i) a diisocyanate;
   (ii) a reactive silicone containing a hydroxyl group or an amine group; and
   (iii) a polyol or a polyamine;
      wherein the metal salt is selected from the group consisting of transition metal salts and lithium salts.

43. The laser printer of claim 42, wherein the roller includes a solid solution of metal salt evenly distributed in the copolymer.

44. The laser printer of claim 42, the roller being substantially free of plasticizer and free of non-reactive silicone oil.

45. The laser printer of claim 42, wherein the copolymer includes between about 0.001% and about 5% of the metal salt by weight.

46. The laser printer of claim 42, wherein the amount of reactive silicone is about 1 wt % to about 20 wt % based on the total weight of the copolymer.

47. The laser printer of claim 42, wherein the molecular weight of the reactive silicone ranges from about 500 to about 30,000.

48. The laser printer of claim 42, wherein the reactive silicone contains an end-capping amino group or an end-capping hydroxyl group.

49. The laser printer of claim 48, wherein the amount of diisocyanate is about 10 wt % to about 50 wt %; the amount of reactive silicone is about 1 wt % to about 10 wt %; and the amount of polyol/polyamine is about 50 wt % to about 85 wt %.

50. The laser printer of claim 42, wherein the reactive silicone has the following formula:

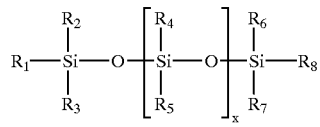

wherein each of $R_1$, $R_5$, and $R_8$, independently, is hydrogen, alkyl, aryl, aralkyl, alkoxy, aryloxy, aralkoxy, hydroxyalkyl, aminoalkyl, hydroxyalkoxy, aminoalkoxy, hydroxyl, or amino; each of $R_2$, $R_3$, $R_4$, $R_6$, and $R_7$, independently, is hydrogen, alkyl, aryl, aralkyl, alkoxy, aryloxy, or aralkoxy; and x is 10–2,000; provided that at least one of $R_1$, $R_5$, and $R_8$ contains a hydroxyl group or an amino group.

51. The laser printer of claim 42, wherein the amount of polyol and/or polyamine is about 50 wt % to about 85 wt % based on the total weight of the copolymer.

52. The laser printer of claim 42, wherein the polyol or polyamine has a molecular weight ranges from about 44 to about 15,000.

53. The laser printer of claim 42, the roller having a hardness of between 25 shore A and 50 shore A.

54. A method of preparing a conductive roller for use in a laser printer, the roller comprising a metal salt evenly distributed in a copolymer formed of precursors including a diisocyanate; a reactive silicone containing a hydroxyl group or an amine group; and a polyol or a polyamine, the method comprising:

supplying three streams of precursors to a roller mold, the first stream containing diisocyanate with an amount ranging from about 10 wt % to about 50 wt %; the second stream containing a silicone-polyol/polyamine mixture wherein the amount of the silicone precursor ranges from about 1 wt % to about 20 wt % and the amount of polyol/polyamine ranges from about 10 wt % to about 45 wt %; and the third stream containing about 10 wt % to about 45 wt % of the polyol/polyamine and about 0.001 wt % to about 5 wt % of the metal salt; and curing the precursors in the roller mold to form the conductive roller; the wt % recited herein being based on the total weight of the copolymer.

* * * * *